United States Patent
Stevenson, III

(10) Patent No.: US 6,539,013 B2
(45) Date of Patent: Mar. 25, 2003

(54) METHOD AND APPARATUS FOR INTERNET ACCESS WHICH BYPASS LOCAL CENTRAL END OFFICE USING DIGITAL LOOP CARRIER AND PERMANENT SIGNAL TREATMENT PROCEDURES

(75) Inventor: K. Martin Stevenson, III, San Rafael, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/923,755

(22) Filed: Sep. 2, 1997

(65) Prior Publication Data

US 2002/0181451 A1 Dec. 5, 2002

Related U.S. Application Data

(60) Provisional application No. 60/025,837, filed on Sep. 5, 1996.

(51) Int. Cl.$^7$ ................................................ H04L 12/28
(52) U.S. Cl. ....................................... 370/376; 375/222
(58) Field of Search ................................ 370/352–356, 370/225, 375, 376; 379/221, 220, 201, 265, 88.17, 220.01, 221.01; 375/222

(56) References Cited

U.S. PATENT DOCUMENTS

| | | | |
|---|---|---|---|
| 4,393,492 A | * 7/1983 | Bishop | 370/225 |
| 4,716,562 A | * 12/1987 | Carse et al. | 370/294 |
| 4,740,963 A | * 4/1988 | Eckley | 370/522 |
| 5,214,692 A | * 5/1993 | Chack et al. | 379/221 |
| 5,216,704 A | * 6/1993 | Williams et al. | 379/93.08 |
| 5,325,404 A | * 6/1994 | Bigey et al. | 370/376 |
| 5,381,405 A | * 1/1995 | Daugherty et al. | 370/376 |
| 5,483,582 A | * 1/1996 | Pugh et al. | 379/144 |
| 5,751,792 A | * 5/1998 | Chau et al. | 379/88.17 |
| 5,805,587 A | * 9/1998 | Norris et al. | 379/88.17 |
| 6,058,110 A | * 5/2000 | Bellenger et al. | 370/352 |
| 6,115,460 A | * 9/2000 | Crowe et al. | 379/900 |
| 6,327,258 B1 | * 12/2001 | Deschaine et al. | 370/356 |

FOREIGN PATENT DOCUMENTS

WO     WO 97/38551     10/1997     ........... H04Q/11/04

OTHER PUBLICATIONS

U.S. patent application Ser. No. 08/777,817; Deschaine et al.; filed Dec. 31, 1996.*

* cited by examiner

Primary Examiner—Chau Nguyen
Assistant Examiner—Jasper Kwoh
(74) Attorney, Agent, or Firm—William J. Tucker; V. Lawrence Sewell

(57) ABSTRACT

The time slot interchange capabilities of modern digital loop carriers are utilized to provide direct connectivity from the calling modem's line to an internet access modem bank through the digital loop carrier, thereby bypassing the local central end office. A call which is to a telephone number of an internet access provider's modem is routed to a bypass initiator. If the bypass initiator detects that the call is from a number which is serviced by a digital loop carrier having a local central end office bypass capability, then the bypass initiator issues a bypass command. The digital loop carrier establishes the bypass connection, but does not break the signaling connection on the initial call which was routed from the digital loop carrier through the local central end office to the bypass initiator. Once the bypass connection has been established, the bypass initiator sends a disconnect signal through the signaling connection of the initial call. The local central end office performs the permanent signal treatment procedures, resulting in the calling modem's line being placed in the permanent signal state at the local central end office, so that the telephone system will know that the calling modem's line is unavailable for incoming calls. When the bypass connection is complete at the end of the internet session, the calling modem's line goes on hook and is reported to the local central end office in the conventional manner.

20 Claims, 6 Drawing Sheets

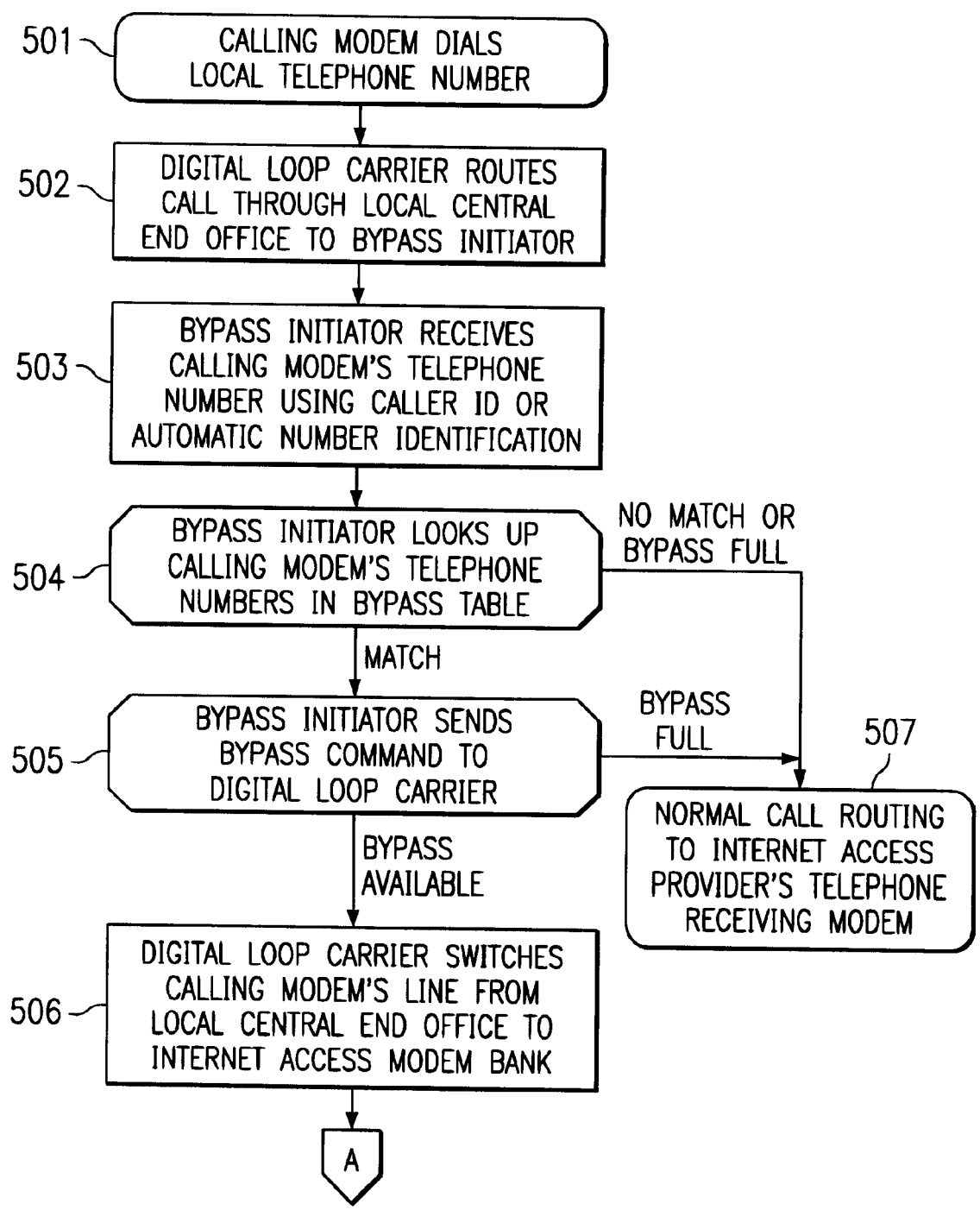

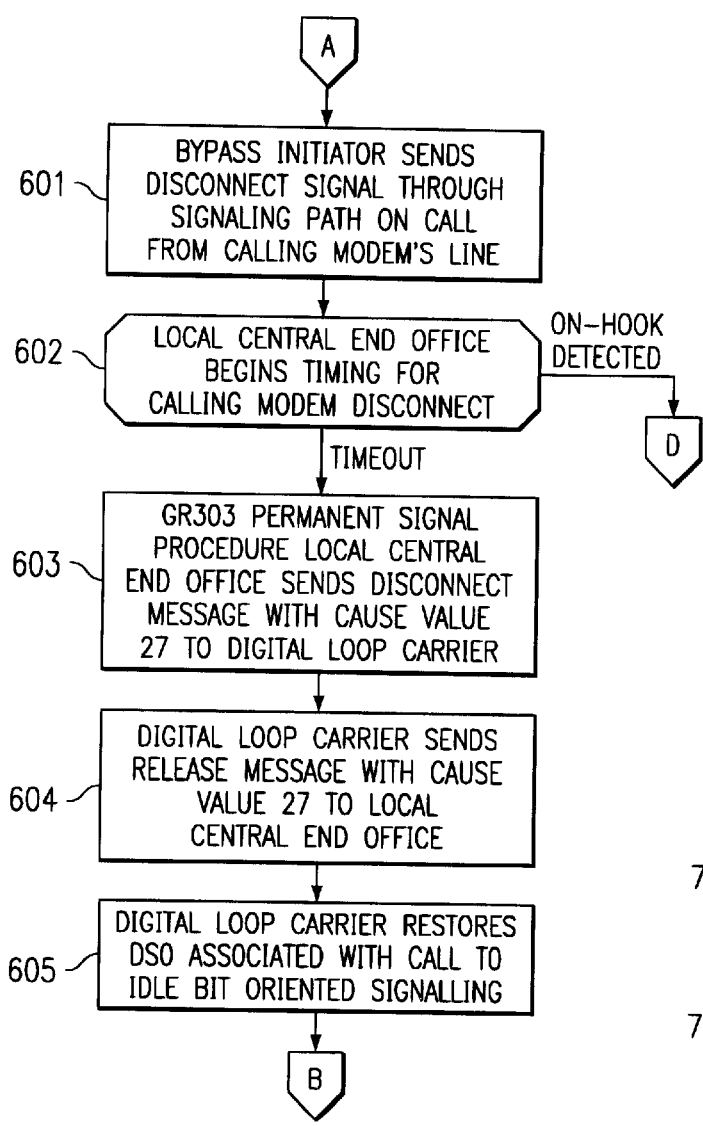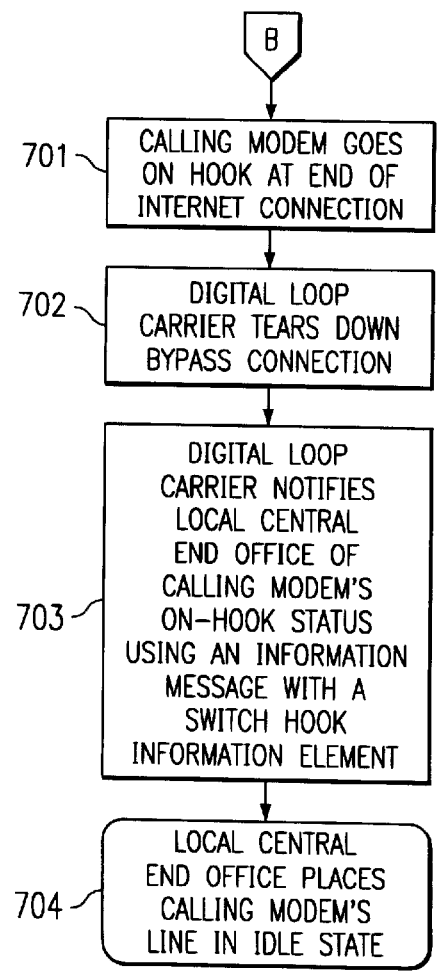

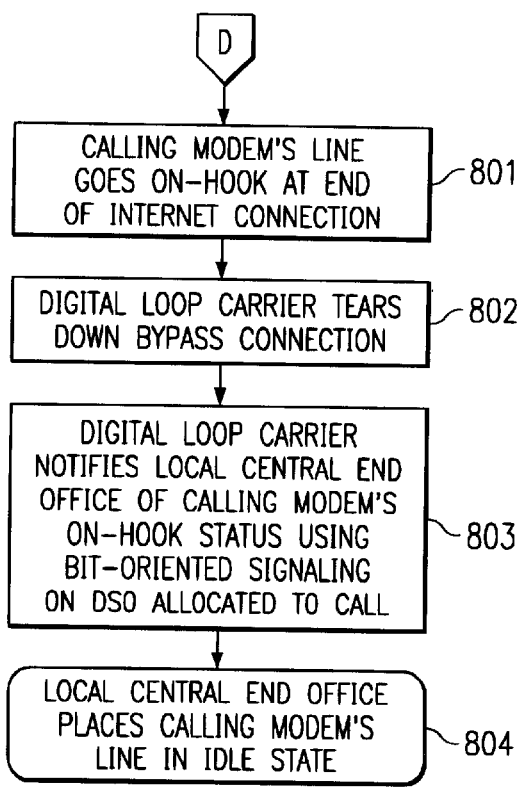
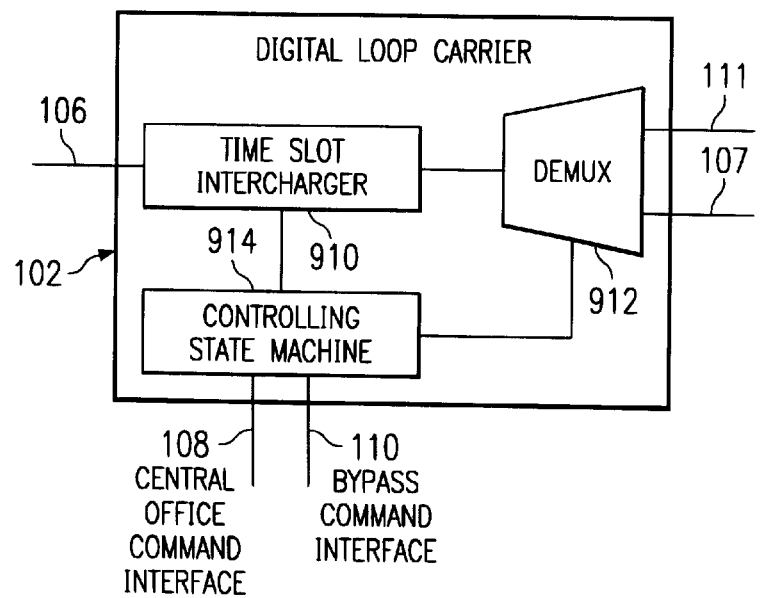

METHOD AND APPARATUS FOR INTERNET ACCESS WHICH BYPASS LOCAL CENTRAL END OFFICE USING DIGITAL LOOP CARRIER AND PERMANENT SIGNAL TREATMENT PROCEDURES

This utility patent application claims the benefit of U.S. Provisional Application No. 60/025,837, filed on Sep. 5, 1996.

BACKGROUND OF THE INVENTION

1. Field of the Invention

The present invention is in the field of telecommunications. In particular, the present invention relates to the routing of modem calls to internet access providers by the telephone system. Specifically, the present invention involves digital loop carriers which interface individual telephone lines to telephone central offices.

2. Discussion of the Related Art

The increasing demand for internet access is resulting in a corresponding increase in the utilization of public local telephone system resources. A telephone subscriber typically accesses the internet through an internet access provider. The telephone subscriber has a calling modem attached to his computer, and the calling modem places a call to the internet access provider's receiving modem through the public local telephone system, which also carries voice, facsimile, and other data transmissions. The connection from the calling modem's line to the internet access provider's receiving modem is typically accomplished via a free local telephone call that often has a statistically lengthy duration in comparison to a typical voice call.

In telephone networks, several telephone lines each having a unique telephone number are first routed to a digital loop carrier, rather than directly to the local central end office. The digital loop carrier has communication trunks to the local central end office, which provide a time multiplexed communication channels to the local central end office. The trunks between the digital loop carrier and the local central end office carry a limited number of DS0 communication channels. Each DS0 communication channel provides enough communication bandwidth to carry a single call. Because the telephone company realizes that many telephone numbers will likely be idle at any given time, there are fewer DS0s available in the trunks from the digital loop carrier to the local central end office than there are telephone numbers being served by the digital loop carrier. When a call is initiated, a DS0 is allocated to the call; at the end of the call, the allocated DS0 is freed up so that it may then be allocated to another new call.

Conventionally, when a calling modem initiates an internet session by dialing an internet access provider, a DS0 in a digital trunk from the digital loop carrier to the local central end office is allocated to the call, and the call is routed through the local central end office for the duration of the internet session. This allocation of the DS0 and allocation of the local central end office switch resources occupies the capacity of the local central end office for the duration of the internet session, thereby limiting the ability of the local central end office to service other calls. The congestion caused by internet calls degrades the performance of the public local telephone systems. As is apparent from the foregoing discussion, it would be desirable for the telephone company to free up as much of the existing public local telephone system's resources as possible while still providing internet access.

SUMMARY OF THE INVENTION

Conventional telephone network systems which route modem calls that are directed to a local internet access provider and which originate from a telephone number serviced by a digital loop carrier require the allocation of resources in the digital loop carrier, the trunks connecting the digital loop carrier to the local central end office, and the local central end office. Using conventional telephone network systems, these allocated resources are fully occupied during the often lengthy duration of the user's internet session. Numerous internet access calls can congest the conventional telephone switching system to the point where it is unable to service new calls. A need exists for freeing up valuable telephone network resources during an internet call while still providing the ability to connect a calling modem's line to an internet access modem bank.

According to the present invention, the time slot interchange capabilities of modern digital loop carriers are utilized to provide more direct connectivity from the calling modem's line to an internet access modem bank through the digital loop carrier, thereby bypassing the local central end office. A call which is to a telephone number of an internet access provider's modem is routed to a bypass initiator. If the bypass initiator detects that the call is from a number which is serviced by a digital loop carrier having a local central end office bypass capability, then the bypass initiator will issue a bypass command. According to the present invention, the digital loop carrier establishes the bypass connection, but does not break the signaling connection on the initial call which was routed from the digital loop carrier through the local central end office to the bypass initiator. Once the bypass connection has been established, the bypass initiator sends a disconnect signal through the signaling connection of the initial call. Because the signaling from the calling modem's line still indicates an off hook status to the local central end office due to the bypass connection, the local central end office begins permanent signal treatment procedures. The permanent signal treatment procedure results in the calling modem's line being placed in the permanent signal state at the local central end office, so that the telephone system will know that the calling modem's line is unavailable for incoming calls. When the bypass connection is complete at the end of the internet session, the calling modem's line goes on hook and is reported to the local central end office in the conventional manner.

In an embodiment of the present invention, the bypass initiator exists at the internet access provider's receiving telephone modem. The bypass initiator has the capability to receive the caller's telephone number using Caller ID or Automatic Number Identification procedures. The telephone company periodically updates the internet access providers' databases with the list of telephone numbers which are serviced by digital loop carriers capable of bypassing the local central end office.

In other embodiments of the present invention, each telephone line corresponds to a specific bypass initiator which is maintained in the telephone system. In these embodiments, the bypass initiator logically includes two tables, one table including the list of called telephone numbers which have modems connected to the internet, and the other table including the list of calling telephone numbers which are serviced by digital loop carriers having local central end office bypass capabilities. According to an embodiment, each local central end office includes a bypass initiator. In this embodiment, the calling number table only includes the calling numbers which are serviced by digital loop carriers having local central end office bypass capabilities that are serviced by that particular local central end office. According to another embodiment, there is a centralized bypass initiator for the telephone system which refers to a centralized table. Both the calling number table and the called number table include telephone numbers serviced by more than one local central end office.

These and other features and advantages of the present invention are described in the Detailed Description of the Invention in conjunction with the Figures.

BRIEF DESCRIPTION OF THE DRAWINGS

FIG. 3 illustrates another embodiment of the local central end office bypass system according to the present invention in which a bypass initiator exists at each local central end office.

FIG. 5 is a flow chart showing the method of bypassing a local central end office according to the present invention.

FIG. 6, is a continuation of FIG. 5 showing the method of bypassing a local central end office according to the present invention.

FIG. 7 is a continuation of FIGS. 5 and 6 showing the method of bypassing a local central end office according to the present invention.

FIG. 8 is a continuation of FIGS. 5, 6, and 7 showing the method of bypassing a local central end office according to the present invention.

FIG. 9 is a detail of pertinent portions of the digital loop carrier shown in FIGS. 1–4.

In the FIGS. 1–9, like parts are referred to with like reference numerals. The Figures are more fully explained in the Detailed Description of the Invention.

DETAILED DESCRIPTION OF THE INVENTION

Figure 1:
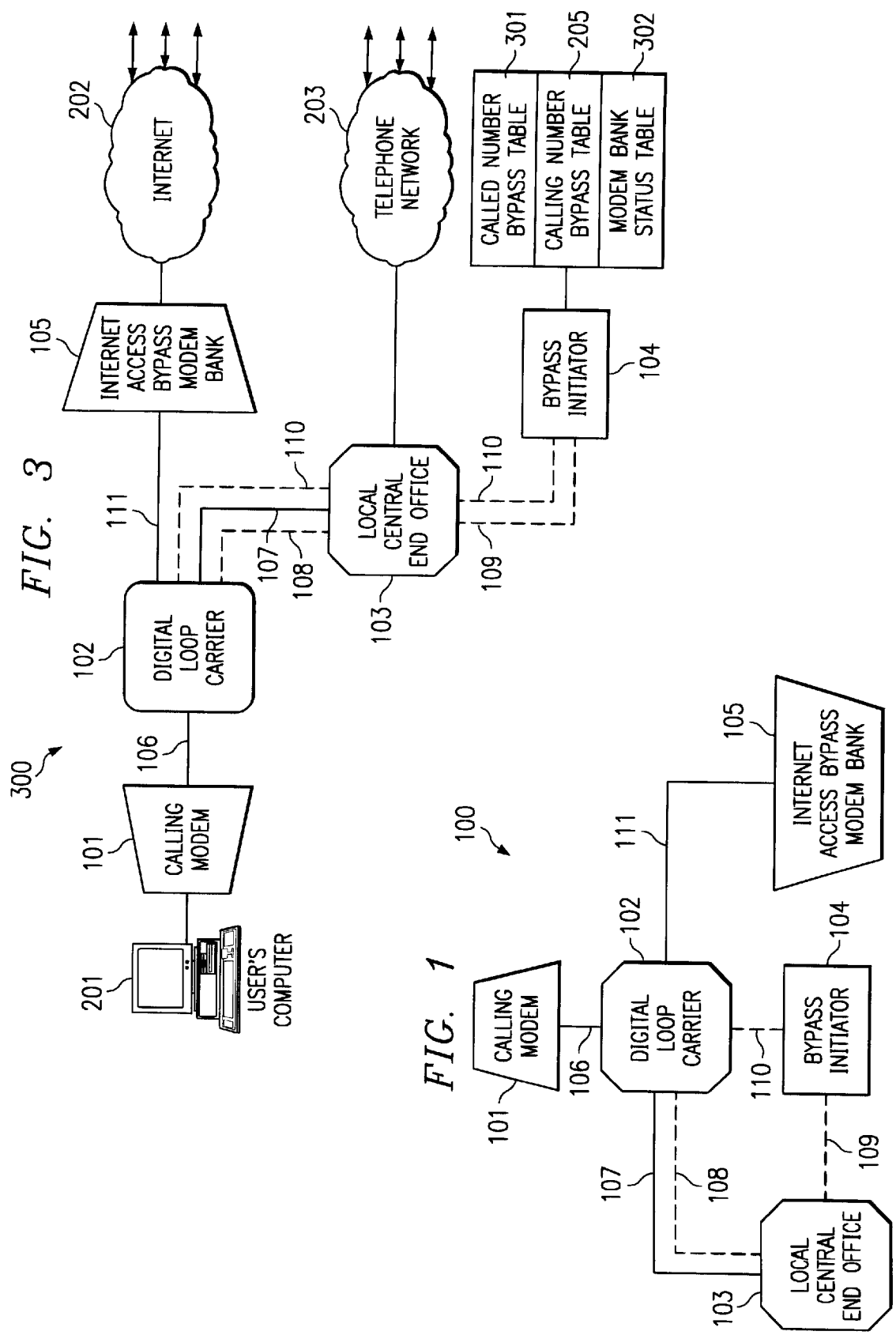
FIG. 1 is a block diagram of the local central end office bypass system according to the present invention.

The local central end office maintains a database of the signaling states and hook statuses of all telephone numbers that it services. Logically, the local central end office has a separate state machine for every telephone number that it services. For example, the "idle state" and the "permanent signal state" are two possible states for a telephone number at the local central end office.

Bell Communications Research, Inc. (Bellcore) has published in 1996 a revised standard defining an interface for the digital loop carrier to local central end office entitled "Integrated Digital Loop Carrier System Generic Requirements, Objectives, and Interface." This publication is commercially available from Bell Communications Research and is hereinafter referred to as "GR303".

Modern digital loop carriers have time slot assignment and interchange capabilities. One way for a single physical input to the digital loop carrier to carry several calls simultaneously is to assign specific time slots on the single physical input to each incoming call. At the output of the digital loop carrier, specific input time slots may be demultiplexed to separate communication trunks.

In modern digital loop carriers, the various time slots in such a time multiplexed signal may demultiplex to different physical trunks which are routed to different transport facilities. The ability to interchange data from one time slot to another therefore essentially provides the digital loop carrier with the ability to switch calls from one transport facility to another.

According to the present invention, the output trunks of the digital loop carrier are separated into two groups which are routed to two separate transport facilities. Specifically, one output trunk group is routed to the local central end office, and the other output trunk group is routed to an internet access bypass modem bank. The internet access bypass modem bank is a gateway into a digital network such as the internet. The fundamental approach of the present invention is to use the time slot interchange capability of modern digital loop carriers to divert the modem call from a DS0 in a digital trunk group going into the local central end office to a DS0 in a digital trunk group going directly to the internet access bypass modem bank.

The Bellcore standard GR303 interface is widely used to interface local central end offices to digital loop carriers. However, GR303 does not anticipate the switching capability of modern digital loop carriers. When a telephone remains off hook after the other party to a call has disconnected, the permanent signal treatment procedures specified in GR303 allows the telephone company to deallocate the DS0 associated with the call, thereby freeing up the DS0 for other usage, but nevertheless to remember at the local central end office that the telephone is off hook. While a DS0 from the digital loop carrier to the local central end office is dedicated to the call, the hook status of the calling modem's line is reported through bit-oriented signaling on the DS0. However, when the DS0 is deallocated and the calling modem's line is placed in the permanent signal state, the off hook to on hook transition at the calling modem's line is communicated to the local central end office from the digital loop carrier by a information message, rather than by bit-oriented signaling on the allocated DS0.

GR303 does not anticipate the ability of modern digital loop carriers to divert a call. If the modem call is diverted from the local central end office to the internet access bypass modem bank, then the local central end office must have some mechanism by which to monitor the hook status of the calling modem's line, in order to have the intelligence to provide a busy signal to any other caller who dials the calling modem's telephone number and thereby to prevent another call from the telephone network from being connected to the calling modem's line.

According to the present invention, if the interface between the digital loop carrier and the local central end office is based on GR303, the Permanent Signal Treatment procedures of GR303 may be used to keep a line being used for a modem call busy at the local central end office while minimizing the resources tied up within the local central end office. The Permanent Signal Treatment procedures are essentially the procedures that the telephone system uses when a calling party forgets to hang up at the end of a call after the called party has terminated the call. The telephone system attempts to free up all resources which were dedicated to the call while still remembering that the calling party's telephone is off hook. Thus, according to the present invention, the resources at the local central end office dedicated to a user's modem call from a residential or small business phone which is served by a digital loop carrier to an internet access provider are minimized by diverting the modem call from the local central end office to an internet access bypass modem bank at the digital loop carrier. The diversion from the local central end office to the internet access bypass modem bank is controlled by a bypass initiator.

FIG. 1 is a block diagram illustrating the important elements of the modem call bypass routing system according to the embodiments of the present invention. In FIG. 1, the user's calling modem 101 is connected to the digital loop carrier 102 through the calling modem's line 106. The digital loop carrier 102 has trunks 107 which form the interface to the local central end office 103. In addition, the digital loop carrier 102 logically has a signaling path 108 with the local central end office 103. The local central end office 103 has at least a signaling path 109 to the bypass initiator 104. The bypass initiator 104 logically has a signaling path 110 to the digital loop carrier 102. The digital loop carrier 102 is connected by bypass communication trunks 111 to an internet access bypass modem bank 105. None of the local central end office 103, the digital loop carrier 102, the internet access bypass modem bank 105, the bypass initiator 104, or the user's calling modem are necessarily co-located.

Figure 2:
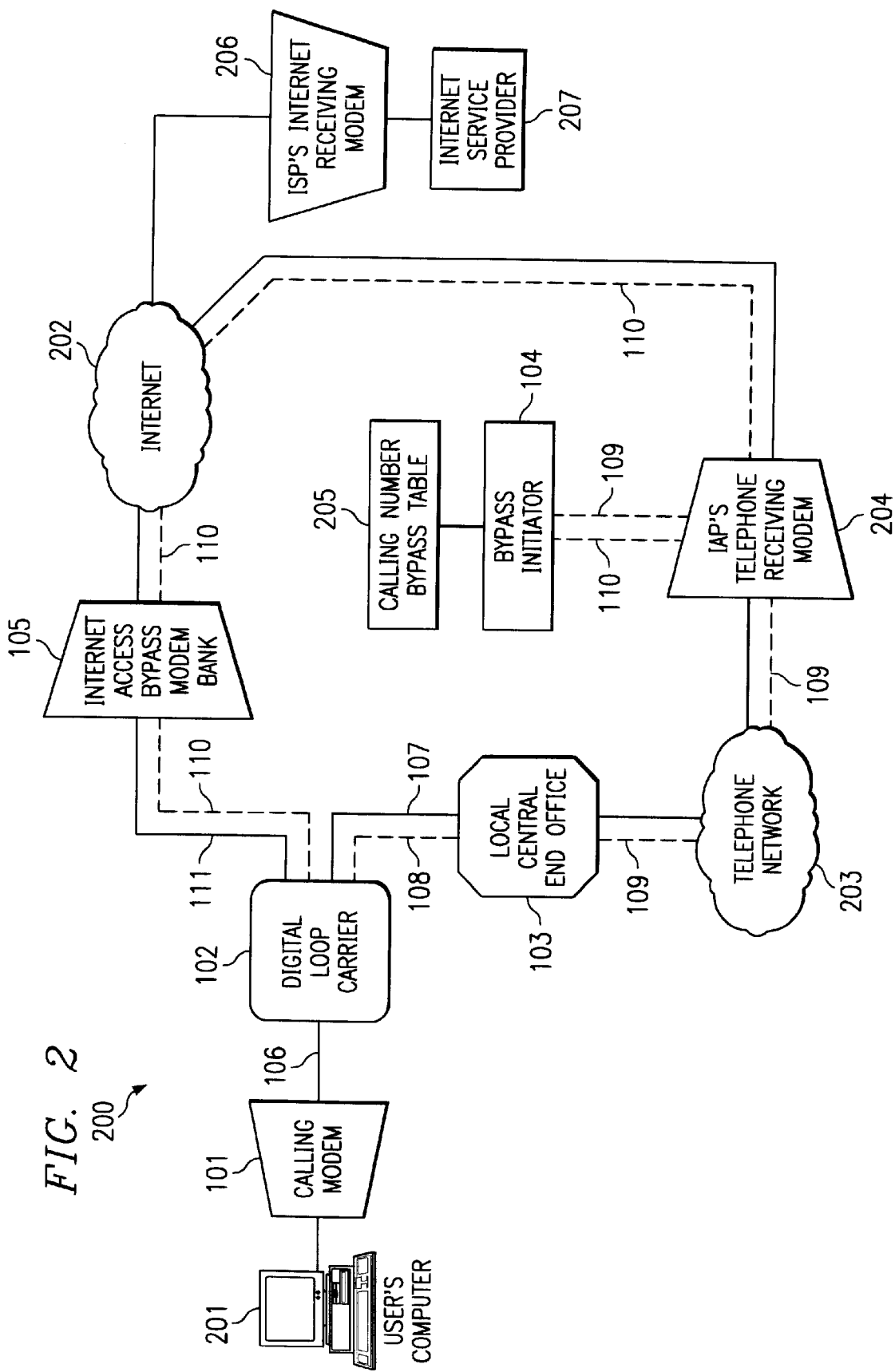
FIG. 2 illustrates an embodiment of the local central end office bypass system according to the present invention in which a bypass initiator exists at each internet access provider's receiving modem.

FIG. 2 illustrates an embodiment 200 of the present invention in which the bypass initiator 104 is connected to an internet access provider's modem bank 204 which receives calls from the telephone system. Therefore, each internet access provider may have his own bypass initiator 104. In this embodiment, the bypass initiator 104 scans its calling number bypass table 205 for all calls which are received by the internet access provider's modem. If the calling modem's telephone number does not appear in the calling number bypass table 205, then the bypass initiator 104 does not issue a bypass command, and the internet access provider's telephone modem 204 handles the call normally as routed through the local central end office 103 as would be the case in the absence of a bypass initiator 104 or digital loop carrier 102 according to the present invention. Thus, if the calling modem's telephone number does not appear in the calling number bypass table 205, then the internet access provider's receiving modem 204 delivers the call to the internet 202.

In this embodiment 200, the routing for the modem call at the local central end office 103 and the other parts of the telephone network 203 is no different than for any other call. Thus, the telephone company merely provides Calling Line Identification in the form of Caller ID or Automatic Number Identification to an internet access provider, and provides a communication link such as a DS0 in the T1 digital carrier link 111 to the digital loop carrier 102 to provide a bypass command signaling interface. Using the calling number bypass table 205, the internet access provider's bypass initiator 104 has the capability to spot an incoming call which is from a telephone number connected to a digital loop carrier 102 capable of bypassing the local central end office 103. The internet access provider also has the capability to command the digital loop carrier 102 to divert the call. The internet access provider then merely tells the local central end office 103 to drop the call in the conventional manner, namely hanging up on the incoming call. Thus, the bypass initiator 104 in the embodiment 200 illustrated in FIG. 2 is at the destination of the normal telephone call which was dialed by the calling modem 101. Because the various bypass initiators 104 at the internet access providers have the capability to issue bypass commands to various digital loop carriers 102 connected to various local central end offices 103 which may exist in the telephone system, the calling number bypass tables 205 existing at the various bypass initiators includes data pertinent to all telephone numbers in the telephone system.

The telephone company is the only entity that installs digital loop carriers. Therefore, the telephone company is the only entity that knows the correlation between digital loop carriers and telephone numbers. Thus, the telephone company constructs and maintains the bypass database which lists all calling telephone numbers which can be bypassed. This database is periodically provided to the internet access providers' bypass initiators 104 which loads them into their calling number bypass tables 205.

The bypass command issued from the bypass initiator 104 to the digital loop carrier 102 must be directed to the proper digital loop carrier 102. Therefore, the calling number bypass table 205 also contains routing information corresponding to each telephone number entry for addressing the proper digital loop carrier 102. In the embodiment 200 illustrated in FIG. 2, the digital loop carrier 102 is programmed to maintain a modem bank status table in order to establish bypass connections to idle modem trunk 111 time slots, to tear down bypass connections, and to refuse bypass commands when its bypass capability is fully occupied.

According to all embodiments of the present invention, the existing GR303 Permanent Signaling Treatment procedures are used to allow the telephone system to recognize the off-hook busy status of the calling modem's line during the bypass connection but to nonetheless free up as much of the telephone system's resources as possible during the bypass connection. Although the present invention requires additional reprogramming of the modern digital loop carrier 102 unique from the programming of the conventional modern digital loop carrier 102, the embodiments 200 and 400 illustrated in FIGS. 2 and 4 also require no reprogramming of the local central end office 103. Some approaches have been proposed which add signaling states to the local central end office 103 in order to provide the local central end office 103 with the capability to recognize the calling modem's line off hook status while the call is bypassed. However, adding signaling states to the local central end office 103 requires reprogramming the local central end office 103, which is a complicated and very costly endeavor. Because the reprogramming of the local central end office 103 is a major undertaking, these embodiments 200 and 400 are especially attractive.

Figure 4:
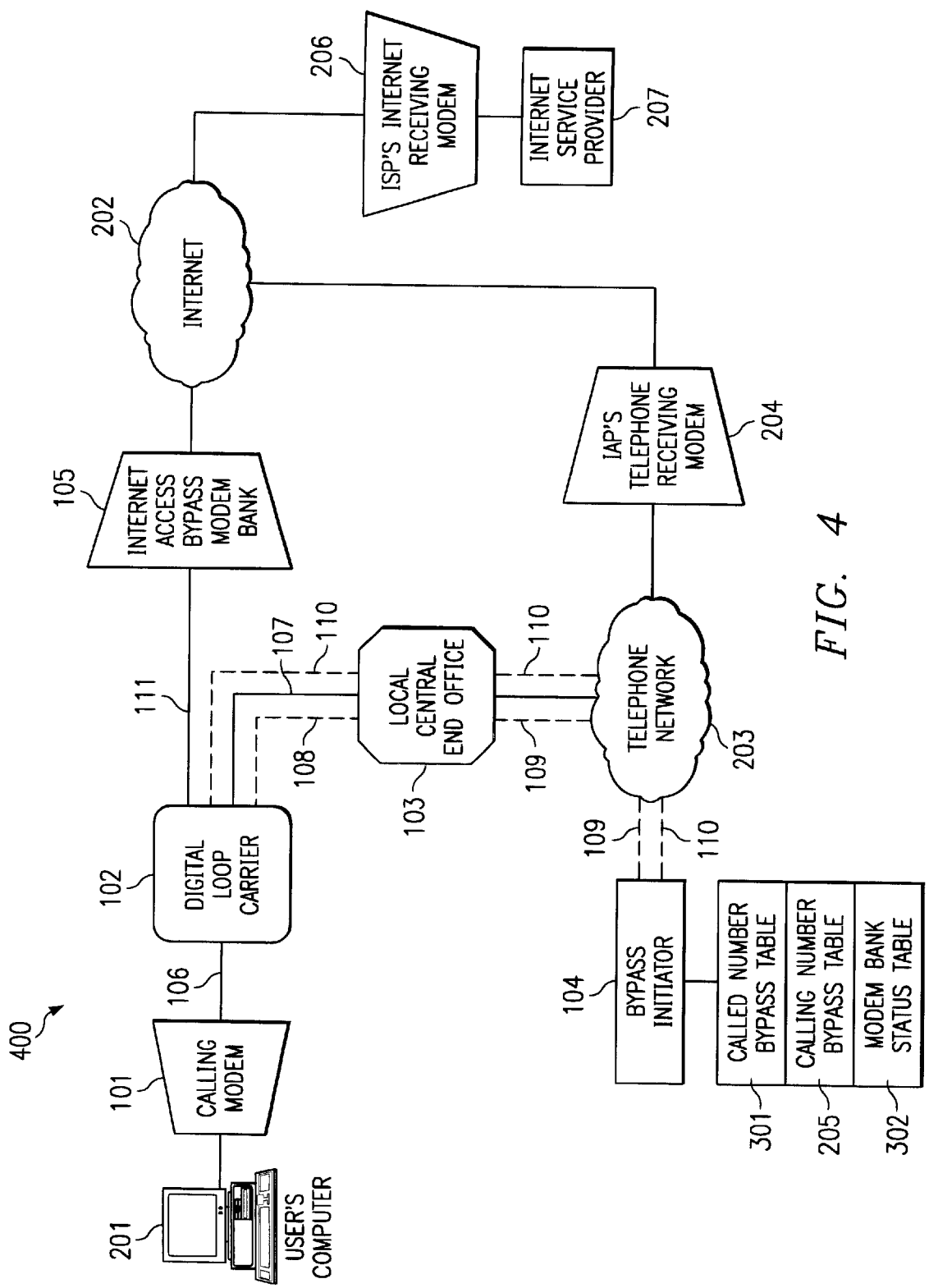
FIG. 4 illustrates yet another embodiment of the local central end office bypass system according to the present invention in which a central bypass initiator exists in the telephone system.

In another embodiment 400 illustrated in FIG. 4, the bypass initiator 104 is part of the telephone system and may be located anywhere in the telephone switching network 203 that is along the path that the signaling will follow for the modem call. In this embodiment 400 of the present invention, the local central end office 103 performs digit analysis on the incoming call to determine if the call needs to be handled by Signaling System 7, which is a conventional call routing messaging protocol which is known in the art. All calls that are determined by the local central end office 103 to need processing by Signaling System 7 are routed to the bypass initiator 104.

Because the telephone company is the only entity that will know the correlation between digital loop carriers and telephone numbers, the telephone company constructs and maintains bypass tables for the bypass initiator 104. As in the previous embodiment, a calling number bypass table 205 includes the calling numbers that are connected to digital loop carriers capable of being switched from the local central end office 103 to an internet access bypass modem bank 105. A separate called number bypass table 301 includes the called numbers which are known to be to connected to internet modems. For example, those telephone numbers which have proven to receive heavy internet usage are added to the called number bypass table 301 by the telephone company. The called number bypass table 301 specifies which called telephone lines are connected to an internet access provider's telephone receiving modem. Only calls which are to telephone numbers appearing in the called number bypass table 301 are candidates for bypass. For calls whose called number appears in the called number bypass table 301, a calling number bypass table 205 operates as described above; specifically, if the calling number appears in the calling number bypass table 205, then a bypass command can be issued. In this embodiment 400, the bypass initiator 104 is central to the telephone system; therefore, the called number bypass table 301, the calling number bypass table 205, and the modem bank status table 302 are complete in the sense that they contain data pertinent to all telephone numbers and internet access bypass modem banks 105 in the telephone system.

According to yet another embodiment 300 of the present invention illustrated in FIG. 3, a bypass initiator 104 corresponds to each local central end office 103. All calls from calling numbers serviced by the local central end office 103 are routed to the bypass initiator 104. In this embodiment 300, because only one bypass initiator 104 can issue a bypass command to any given digital loop carrier 102, a modem bank status table 302 is also associated with the specific bypass initiator 104 which keeps track of the status of the DS0s in the bypass trunks 111. Because the bypass initiator 104 only handles calls originating from its corresponding local central end office 103, the calling number bypass table 205 is pertinent only to those telephone numbers serviced by the corresponding local central end office 103. Similarly, the modem bank status table 302 contains data relevant only to the internet access bypass modem banks 105 and trunks 111 connected to digital loop carriers 102 which connect to the local central end office 103.

In the embodiments 300 and 400 illustrated in FIG. 3 and 4, Caller ID or Automatic Number Identification are not used by the bypass initiator 164 to identify the calling number. Instead, the bypass initiator 104 which exists within the telephone company uses its interoffice signaling and messaging capabilities to learn the calling and called numbers.

In embodiments 300 and 400 illustrated in FIGS. 3 and 4, respectively, the bypass initiator 104's signaling link 110 to the digital loop carrier 102 is provided through the normal local central end office 103, although (as illustrated in FIG. 1) this is not strictly required according to the present invention.

FIGS. 5 through 8 illustrate a method of routing internet calls according to the present invention. Modem calls to a telephone number having a bypass initiator 104 through a digital loop carrier 102 having a bypass route proceed as described below. The method begins at step 501 as the calling modem 101 dials a local telephone number.

At step 502, this call is routed through a digital loop carrier 102 and local central end office 103 to the bypass initiator 104. In the embodiment 200, this routing to the bypass initiator 104 attached to the local telephone number's modem is conventional (based on the called party's number). In the embodiment 300, this routing to the bypass initiator 104 is for all calls. In the embodiment 400, this routing to the bypass initiator is only for calls determined by the local central end office to need Signaling System 7 routing.

At step 503, the bypass initiator 104 receives the calling modem's telephone number. In embodiment 200, the bypass initiator 104 receives the caller's telephone number either by using conventional Caller ID or Automatic Number Identification procedures. In embodiments 300 and 400, the bypass initiator 104 receives the caller's telephone number via conventional Signaling System #7 protocols.

At step 504, the bypass initiator 104 scans the bypass tables 301, 302, and/or 205. In embodiment 200, the bypass initiator 104 scans the calling number bypass table 205; if the calling number is in the table 205, the bypass initiator 104 issues a bypass command to the digital loop carrier at step 505. In embodiments 300 and 400, the bypass initiator 104 scans the called number bypass table 301, the calling number bypass table 205, and the modem bank status table 302; if matches are found in all tables 301 and 205, and if the modem bank status table 302 indicates that an idle channel to internet access bypass modem bank 105 exists, then the bypass initiator 104 issues a bypass command to the digital loop carrier at step 505.

The bypass command to the digital loop carrier 102 to initiate the bypass is best implemented using the same GR303 protocol that the local central end office 103 uses to initiate a call. According to one alternative, the interface between the bypass initiator 104 and the digital loop carrier 102 is implemented as a TL1 interface. A TL1 interface is conventionally used between a local central end office 103 and a digital loop carrier 102 in reprovisioning or reconfiguring the switching capability of the digital loop carrier 102. The TL1 interface alternative between the bypass initiator 104 and digital loop carrier 102 allows an easy mechanism to establish the bypass connection, but is more difficult to tear down the bypass connection than the preferred alternative described below.

According to the preferred alternative, GR303 TMC interface (time slot management channel) is used between the bypass initiator 104 and digital loop carrier 102. A GR303 IMC interface is the same interface used between the local central end office 103 and digital loop carrier 102 for an incoming call to the digital loop carrier 102 from the local central end office 103. The GR303 TMC interface involves bit-oriented signaling regarding hook status. In this alternative, the bypass initiator 104 bypass command initiates an incoming call from the internet access bypass modem bank 105. Each interface to the digital loop carrier 102 has its own data link. Thus, there is a data link 108 between the local central end office 103 and the digital loop carrier 102, and a separate data link 110 between the bypass initiator 104 and the digital loop carrier 102. According to the present invention, the digital loop carrier 102 is reprogrammed so that it recognizes that whenever the source of a incoming call command is the data link 110 assigned to bypass initiators, the digital loop carrier 102 realizes that this is bypass initiation, thereby knowing to carry out the remaining steps of the bypass procedure of the present invention described below.

If the step 504 criteria for sending out a bypass command are not satisfied, normal call routing to the called number is performed at step 507. At step 505 in embodiment 200, if the digital loop carrier 102 notices upon receipt of the bypass command that its bypass capability is fully occupied, then the digital loop carrier refuses the bypass command, and normal call routing to the called number is performed at step 507.

At step 506, when the digital loop carrier 102 receives the bypass command and bypass is possible, it connects a data path between the calling modem's line and a DS0 in a trunk to the internet access bypass modem bank 105. This connection is performed using the time slot interchange capability of the digital loop carrier 102. However the digital loop carrier 102 does not break the signaling connection to the local central end office 103 that was created when the call was initiated. Therefore, the hook status of the calling modem's line continues to be reported to the local central end office 103 from the digital loop carrier 102 in a conventional manner. If the local central end office 103 had dedicated a DS0 to the call, the hook status of the calling modem's line continues to be reported through bit-oriented signaling within the DS0. As long as the calling modem remains off hook during its connection to the internet access modem bank, the calling modem's off hook status is communicated to the local central end office 103 using off hook bit-oriented signaling.

At step 601, the bypass initiator 104 confirms that the bypass has occurred by monitoring the data coming into it on its call. After the bypass has occurred at the digital loop carrier 102, the calling modem's data will no longer be routed to the internet access provider's telephone receiving modem, but rather will be routed to the internet access bypass modem bank 105. Thus, by digit analysis of the signaling still progressing through the telephone system to the bypass initiator 104, the bypass initiator 104 will know that the bypass has occurred.

At step 601, once the bypass initiator 104 confirms that the bypass operation is in progress, the bypass initiator 104 then sends disconnect on the call coming into it from the local central end office 103.

At step 602, the local central end office 103 begins timing for the calling modem's line 106 to disconnect. (The telephone company expects the calling party to hang up after the called party has hung up.) Since the calling modem is off-hook in its modem connection, the local central end office 103 continues to see off-hook from the calling modem's line 106. The local central end office 103 proceeds through its normal permanent signal processing, giving the appropriate tones and announcements asking the calling party 101 to hang up.

When the timeout occurs, at step 602 the local central end office 103 begins the GR303 permanent signal procedure. In this procedure, the local central end office 103 sends a disconnect message with cause value 27, indicating that the destination (the calling modem's line 106) is presently out of service. (Cause value 27 initiates the placement of the calling modem's line 106 into the permanent signaling state at the local central end office 103.)

At step 604, the digital loop carrier 102 receives this disconnect message from the local central end office 103 and follows normal GR303 permanent signal procedure, which specifies the sending of a release message with cause value 27 to the local central end office 103.

At step 605, the digital loop carrier 102 restores the DS0 associated with the call to its idle bit-oriented signaling.

The bypassing modem data connection from the digital loop carrier 102 to the internet access bypass modem bank 105 is not disturbed by this tearing down of the call to the bypass initiator 104 through the local central end office 103 and the digital loop carrier 102.

In step 701, at the end of the bypass connection, the calling party's modem 101 goes on hook. This transition of the calling party's modem from off hook to on hook at the end of the internet call is detected at the digital loop carrier 102 in the case of a bypassing modem connection.

At step 702, in response to the calling modem's line 106 going on hook, the digital loop carrier 102 tears down the bypassing connection. This may be either initiated within the digital loop carrier or through the normal GR303 disconnect sequence initiated when the bypass modem bank detects the disconnect of the calling modem.

At step 703, the digital loop carrier 102 notifies the local central end office 103 that the calling modem's line 106 is now on hook in the same manner it would have had there not been any bypassing connection. Because a disconnect message with cause value 27 has been received by the digital loop carrier 102 due to timeout in the permanent signal treatment procedure, an information message with a switch hook information element is sent by the digital loop carrier 102 to the local central end office 103 report that the calling modem's line is now on hook.

At step 704, the local central end office 103 receives the information message and places the calling modem's line 106 in the idle state.

If the bypass connection lasts for only a short duration, then the calling modem's line 106 may go on hook at step 801 before the timeout at step 602 is reached. In this case, at step 802 the digital loop carrier 102 tears down the bypass connection. Because no disconnect message with cause value 27 has been received by the digital loop carrier 102, the digital loop carrier 102 notifies the local central end office 103 of the calling modem's line's on hook status using bit-oriented signaling on the DS0 which is still allocated to the call from the calling modem 101 to the bypass initiator 104.

The command interface between the bypass initiator and the digital loop carrier 102 is preferably either a TL1 interface or a GR303 TMC interface. In either case, according to the present invention, a substantial reprogramming of the conventional modern digital loop carrier 102 modifies the TMC state machine within the digital loop carrier 102 to handle the three-way association among the subscriber line 106, the local central end office interface 103, and the bypass connection 111.

If a TL1 interface is used, the bypass initiator 104 logs into each digital loop carrier 102 following normal login procedures. One way to instantiate the datapath for this 20 connection is an X.25 network. (X.25 is an ITU signaling standard known in the art.) Using the X.25 network, the bypass connection could then be established using an ENT-CRS-TO command (enter cross connect at DS0 rate) with a special parameter to indicate that it is requesting a bypass connection.

In embodiments 300 and 400, the bypass initiator 104 has a mechanism by which it can identify when a bypass DS0 is available for a new modem call. This mechanism preferably involves monitoring the called modem's status. In embodiment 300 illustrated in FIG. 3, each local central end office 103 has a bypass initiator 104 associated with it and maintained by the telephone company. This bypass initiator 104 controls all bypasses from digital loop carriers connected to that particular local central end office 103. In embodiment 400 illustrated in FIG. 4, the telephone system has a centralized bypass initiator 104 or has multiple bypass initiators (not shown) which each handle calls originating from a specific, mutually exclusive sets of calling telephone numbers. In either of these cases, the bypass initiator 104 corresponding to any bypass connection preferably monitors the called modem status in the internet access bypass modem bank 105 to which it established a bypass connection. In this manner the bypass initiator 104 database includes status information for all bypass modems to which it can send bypass commands.

The preferred interface between the bypass initiator 104 and digital loop carrier 102 (and between the local central end office 103 and digital loop carrier 102) is a GR303 TMC interface. GR303 provides for two separate interface standards, namely time slot management channel (TMC) and common signaling channel (CSC), between the local central end office 103 and digital loop carrier 102. According to the present invention, the time slot management channel is used to allocate a DS0 to a specific call at call setup time. Bit-oriented signaling within the allocated DS0 is used to signify disconnect. Once disconnect has been detected, the time slot management channel is further used to clear the allocated DS0. In GR303, a digital loop carrier 102 is referred to as a "remote digital terminal" (RDT). GR303 specifies a virtual remote digital terminal capability (VRDT), which allows a single remote digital terminal to emulate two or more remote digital terminals.

According to the present invention, the virtual remote digital terminal feature within the digital loop carrier 102 is modified so that a time slot management channel data link pair is identified as the bypass command data link 110. The bypass command data link 110 has its own set of interface Ti digital carrier links. A "call reference value"(CRV) is a unique identifier across the local central end office 103 or bypass initiator 104 to remote digital terminal interface for a subscriber's line 106. The bypass command data link 110 shares subscriber call reference values with the virtual remote digital terminal corresponding to the connection of the local central end office 103 to the digital loop carrier 102. The bypass connection is initiated by a setup message from the bypass initiator 104 on the bypass command data link 110. In response to the setup message from the bypass initiator 104, the digital loop carrier 102 acknowledges by sending a connect message to the bypass initiator 104. In the embodiments 300 and 400, after the internet call is finished and the calling modem goes on-hook, the digital loop carrier 102 notifies the bypass initiator 104 through a disconnect message on its time slot management channel with the bypass initiator 104. This disconnect message from the digital loop carrier 102 to the bypass initiator 104 enables the bypass initiator 104 to maintain its records regarding the status of all the bypass modems and DS0s, and this disconnect message is in addition to the normal GR303 TMC processing which occurs over the local central end office's time slot management channel. According to the present invention, the digital loop carrier's time slot management channel state machine is modified so as to send the disconnect message to the bypass initiator 104 until it receives an acknowledging release message from the bypass initiator 104.

FIG. 9 is a detail of pertinent portions of the digital loop carrier 102 shown in FIGS. 1–4. As can be seen, it includes a time slot interchanger 910 operable to switch data between various time slots of a time multiplexed signal, and a demultiplexor 912 coupled to the time slot interchanger operable to physically demultiplex the time multiplexed signal onto a plurality of physically separate output trunks coupled to the demultiplexor. The output trunks include those in central office output trunk group 107 and those in the bypass output trunk group 111. The digital loop carrier 102 also includes a controlling state machine 914 coupled to the time slot interchanger and demultiplexor. FIG. 9 illustrates the a central office command interface coupled to the controlling state machine 914 for allocating and deallocating central office output trunk group time slots, as well as the bypass command interface coupled to the controlling state machine 914 for controlling the interchanging of data between time slots demultiplexing to different output trunk groups.

While the present invention has been described herein with reference to several specific embodiments, those embodiments are offered by way of example, not by way of limitation. Those skilled in the art will be enabled by this disclosure to add to or modify the present invention in various obvious ways. For example, although the present invention has been described with reference to internet calls, other types of calls with longer than average holding times may be routed in a similar manner. As another example, command interfaces other than those described herein may be used between the bypass initiator and the digital loop carrier. Other changes and modifications of the present invention are readily ascertainable by those skilled in the art. Such additions, changes, and modifications do not depart from the spirit and scope of the present invention as set out in the appended claims.

What is claimed is:

1. A digital loop carrier having time slot interchange means and demultiplex means, comprising:

a central office output trunk group coupled between the demultiplex means of the digital loop carrier and a local central end office;

a bypass output trunk group coupled between the demultiplex means of the digital loop carrier and a bypass modem bank;

a subscriber line coupled to the time slot interchange means for communicating, to and from a calling modem, modem data that is also communicated through the central office output trunk group or the bypass output trunk group;

wherein upon receipt of a data call from the calling modem on the subscriber line, a communications trunk in the central office output trunk group and a signaling path are established with the local central end office;

wherein upon receipt of a bypass command initiated by a bypass initiator, the data call is switched from the central office output trunk group to the bypass output trunk group without switching the signaling path connected to the local central end office;

wherein the communications trunk in the central office output trunk group is torn down while the data call is maintained on the bypass output trunk group; and wherein the local central end office is informed of an on hook status of the calling modem on the subscriber line by:
  bit-oriented signaling on the communications trunk in the central office output trunk if the communications trunk in the central office output trunk is still allocated to the data call; and an information message on the signaling path if the communications trunk in the central office output trunk supporting the data call has been torn down.

2. The digital loop carrier as in claim 1, wherein the bypass initiator is issued a connect message after the data call is switched from the central office output trunk group to the bypass output trunk group;

upon receiving the connect message, the bypass initiator issues a first disconnect message to the local central end office;

upon receiving the first disconnect message, the local central office issues a second disconnect message indicating that the subscriber line is out of service to the digital loop carrier; and upon receipt of the second disconnect message, the digital loop carrier issues a release message to the local central end office to tear down the communications trunk in the central office output trunk group.

3. The digital loop carrier as in claim 1, wherein, responsive to the on hook status of the subscriber line, the digital loop carrier is operable to issue a bypass disconnect message to the bypass initiator.

4. The digital loop carrier as in claim 1, wherein, responsive to the on hook status of the subscriber line, the digital loop carrier is operable to periodically issue a bypass disconnect message to the bypass initiator until an acknowledging release message is received from the bypass initiator.

5. A method of routing a data call at a digital loop carrier, the method comprising the steps of:

receiving, at the digital loop carrier, the data call on a subscriber line from a calling modem;

upon receiving the data call, setting up a connection in a central office output trunk group and a signaling path between a local central end office and the digital loop carrier;

receiving, at the digital loop carrier, a bypass command initiated by a bypass initiator;

switching the data call from the central office output trunk group to a bypass output trunk group located between a bypass modem bank and the digital loop carrier without switching the signaling path between the local central end office and the digital loop carrier;

tearing down the connection in the central office output trunk group while continuing to maintain the data call in the bypass output trunk group; and detecting an on hook status of the data call on the subscriber line and then informing the local central end office by using:

bit-oriented signaling in the central office output trunk if the connection in the central office output trunk is still allocated to the data call; and an information message on the signaling path if the connection in the central office output trunk originally supporting the data call has been torn down.

6. The method of routing a data call at a digital loop carrier as in claim 5, wherein said step of tearing down the connection in the central office output trunk further includes:

after the data call is switched from the central office output trunk group to the bypass output trunk group, issuing a connect message from the digital loop carrier to the bypass initiator;

issuing a first disconnect message from the bypass initiator to the local central end office;

receiving, at the digital loop carrier, a second disconnect message from the local central end office indicating that the subscriber line is out of service; and upon receipt of the second disconnect message, issuing a release message from the digital loop carrier to the local central end office.

7. The method of routing a data call at a digital loop carrier as in claim 5, further comprising the step of:

responsive to the on hook status, issuing a bypass disconnect message from the digital loop carrier to the bypass initiator.

8. The method of routing a data call at a digital loop carrier as in claim 5, further comprising the step of:

responsive to the on hook status, periodically issuing a bypass disconnect message from the digital loop carrier to the bypass initiator until an acknowledging release message is received.

9. A digital loop carrier, comprising:

an input for receiving a data call from a calling modem on a subscriber line; .

time slot interchange means, coupled to said input, for interchanging the data call onto a data path by assigning specific time slots on the data path to the data call;

demultiplex means, coupled to the data path, for demultiplexing the data call on the data path onto a communications trunk in a central office output trunk group connected to a local central end office, wherein said local central end office interfaces with a bypass initiator capable of issuing a bypass command;

said demultiplex means, upon receiving the bypass command from the bypass initiator, switches the data call from the communications trunk in the central office output trunk group to a communications trunk in a bypass output trunk group connected to a bypass modem bank; and after switching the data call from the communications trunk connected to said local central end office to the communications trunk connected to said bypass modem bank, said local central end office is informed of an on-hook status of the calling modem using:

bit-oriented signaling on the communications trunk in the central office output trunk if the communications trunk in the central office output trunk is still allocated to the data call; and an information message on a signaling connection if the communications trunk in the central office output trunk originally supporting the data call has been deallocated.

10. The digital loop carrier of claim 9, wherein said communications trunk in the central office output trunk group is a DS0.

11. The digital loop carrier of claim 9, wherein said communications trunk in the central office output trunk group is a time slot management channel.

12. The digital loop carrier of claim 9, wherein signaling connection is a common signaling channel.

13. The digital loop carrier of claim 9, wherein said communications trunk in the central office output trunk is deallocated in accordance with a permanent signal treatment procedure.

14. The digital loop carrier of claim 9, wherein said local central end office places the calling modem in a permanent signaling state after the communications trunk in the central office output trunk has been deallocated.

15. A method for routing a data call at a digital loop carrier, said method comprising the steps of:

receiving the data call from a calling modem on a subscriber line; interchanging the data call onto a data path by assigning specific time slots on the data path to the data call;

demultiplexing the data call on the data path onto a communications trunk in a central office output trunk group connected to a local central end office;

upon receiving a bypass command from a bypass initiator, switching the data call from the communications trunk in the central office output trunk group to a communications trunk in a bypass output trunk group connected to a bypass modem bank; and informing said local central end office of an on-hook status of the calling modem by using:

bit-oriented signaling on the communications trunk in the central office output trunk if the communications trunk in the central office output trunk is still allocated to the data call; and an information message on a signaling connection if the communications trunk in the central office output trunk originally supporting the data call has been deallocated.

16. The method of claim 15, wherein said communications trunk in the central office output trunk.group is a DS0.

17. The method of claim 15, wherein said communications trunk in the central office output trunk group is a time slot management channel.

18. The method of claim 15, wherein signaling connection is a common signaling channel.

19. The method of claim 15, wherein said communications trunk in the central office output trunk is deallocated in accordance with a permanent signal treatment procedure.

20. The method of claim 15, wherein said local.central end office places the calling modem in a permanent signaling state after the communications trunk in the, central office output trunk has been deallocated.

* * * * *